US006862283B2

(12) United States Patent
Marietta et al.

(10) Patent No.: US 6,862,283 B2
(45) Date of Patent: Mar. 1, 2005

(54) METHOD AND APPARATUS FOR MAINTAINING PACKET ORDERING WITH ERROR RECOVERY AMONG MULTIPLE OUTSTANDING PACKETS BETWEEN TWO DEVICES

(75) Inventors: Bryan D. Marietta, Austin, TX (US); Daniel L. Bouvier, Austin, TX (US); Robert C. Frisch, Westford, MA (US)

(73) Assignees: Freescale Semiconductor, Inc., Austin, TX (US); Mercury Computer Systemc, Inc., Chelmsfor, MA (US)

( * ) Notice: Subject to any disclaimer, the term of this patent is extended or adjusted under 35 U.S.C. 154(b) by 807 days.

(21) Appl. No.: 09/758,864

(22) Filed: Jan. 11, 2001

(65) Prior Publication Data

US 2001/0030964 A1 Oct. 18, 2001

Related U.S. Application Data

(60) Provisional application No. 60/175,856, filed on Jan. 13, 2000.

(51) Int. Cl.[7] ............................................. H04L 12/28
(52) U.S. Cl. ...................... 370/394; 370/235; 370/242
(58) Field of Search ............................ 370/394, 389, 370/392, 400, 401, 410, 412, 229, 235, 236, 241, 242, 243, 252, 216, 351, 444

(56) References Cited

U.S. PATENT DOCUMENTS

| | | | | |
|---|---|---|---|---|
| 5,923,655 A | * | 7/1999 | Veschi et al. ................ 370/394 |
| 6,009,094 A | | 12/1999 | Morioka ..................... 370/394 |
| 6,452,926 B1 | * | 9/2002 | Wiklund ..................... 370/388 |
| 6,545,981 B1 | * | 4/2003 | Garcia et al. ............... 370/242 |
| 6,584,111 B1 | * | 6/2003 | Aweya et al. ............... 370/412 |
| 6,611,521 B1 | * | 8/2003 | McKay et al. .............. 370/392 |

OTHER PUBLICATIONS

U.S. Provisional Application 60/175,856, filed by Bryan D. Marietta on Jan. 13, 2000 entitled, Rio Bus Protocol.

* cited by examiner

*Primary Examiner*—Brian Nguyen
(74) *Attorney, Agent, or Firm*—Robert L. King

(57) ABSTRACT

A data communication system (10) has a plurality of devices (12, 14, 17) which communicate by transmitting information packets having order tags which are processed by an input unit (60) and an output unit (30) in each device. A packet is sent from a transmitting device to a receiving device having an ordering tag wherein both devices are initially order synchronized by starting with the same ordering tag value. Packet transmissions are forced to occur in an order which follows a predetermined ordering of order values which the ordering tags can have. If the receiving device does not receive a packet having the correct order tag value or if a transmission error is detected, the receiving device tells the transmitting device to resend the packet. Any subsequent outstanding transmissions are discarded. Packet ordering and verification occurs at each device-to-device connection.

18 Claims, 2 Drawing Sheets

METHOD AND APPARATUS FOR MAINTAINING PACKET ORDERING WITH ERROR RECOVERY AMONG MULTIPLE OUTSTANDING PACKETS BETWEEN TWO DEVICES

RELATED APPLICATIONS

This non provisional patent application claims a right of priority and the benefit of Provisional U.S. patent application Ser. No. 60/175,856 filed Jan. 13, 2000 entitled "Rio Bus Protocol" by Bryan Marietta pursuant to 35 U.S.C. §119(e).

FIELD OF THE INVENTION

The present invention relates to communication systems and, more particularly, to data transmission techniques among communication devices.

BACKGROUND OF THE INVENTION

Communication systems may be generally characterized as having two or more devices which communicate via an interconnect. In all communication systems, the transmission of data must be in some expected manner or order to maintain a meaning between the transmitting and receiving devices. The interconnects may be generally classified as being ordered or unordered. An unordered interconnect is an interconnect wherein information after being transmitted through the interconnect requires reordering at the destination. For example, in systems with unordered interconnects the output data from a transmitting device will not necessarily be received at a receiving device in the same data order that it was sent. For any one of a number of possible reasons, the interconnect may allow subsequently issued data to be passed forward of the earlier sent data. In such systems, a reordering process must be implemented at the destination of the data transmission. Disadvantages associated with systems having unordered interconnects include the expense associated with required hardware at destination points to perform the reordering function. Another disadvantage with systems having unordered interconnects is that such systems may require end-to-end retries to conform to proper ordering of data. Sometimes this reordering function may be implemented in software. An endpoint in an unordered system may encounter numerous concurrent requests from different sources. As a result, system performance quickly degrades due to the unpredictability of what order numerous data from potentially differing sources will be provided to a destination by the interconnect. Such systems may also require resource allocation which involves additional overhead and potential system performance degradation. Examples of types of systems having unordered interconnects include ethernet systems (IEEE 802), SCI systems (Scalable Coherent Interconnect, the IEEE 1596-1994 standard), ATM (Asynchronous Transfer Mode) systems and numerous other protocols commonly implemented for internet systems.

As an alternative to unordered interconnects, systems having ordered interconnects may be used. Examples of this type of system include PCI (Peripheral Component Interconnect) and PCI-X (Peripheral Component Interconnect Extensions). These protocols are very common for desktop computing systems. In these known systems with ordered interconnects, only one outstanding transaction is permitted to exist in the system between two devices. In other words, an acknowledge signal must be provided by a target device on the bus segment in which the transaction was initiated and received by the transmitting device before the transmitting device can provide a new transaction. That rule ensures certainty at a destination point that a transmitted transaction is received before another transaction is issued. This rule guarantees simplicity in the system and avoids any need for transaction reordering circuitry and resource allocation. However, because of the ensured certainty obtained by having only one outstanding transaction at any point in time in the interconnect, the system performance is reduced because of a lower amount of data being transmitted at the same time, especially for end-to-end transactions where the end devices are physically separated by a significant distance. Additionally, PCI and PCI-X require a synchronous system in which a transmitting endpoint device is clocked synchronously with a receiving endpoint device. The lower performance can be compensated for by using a higher clock frequency to clock the data, but clock rates are limited in speed due to the synchronous nature of the system. Even at higher clock speeds system performance is restrained by the single transaction nature of the interconnect. Synchronously clocked systems also require overhead to implement and maintain synchronous clocks at all endpoints of the system. Further limiting the performance of PCI and similar protocols is the fact that a transaction type is associated with each piece of data sent. In addition to creating such transaction types, both the interconnect and a receiving endpoint must then evaluate the type of data transaction and group similar type transactions together. All of these functions at numerous points in a system operate to add significant overhead to the system.

Data recovery to identify and correct data transmission errors is also a task which is not efficiently performed in many existing communication systems. For example, in ethernet-based systems, when more data packets exist in the interconnect than can be handled, the system is designed to drop or discard the data packets. The destination unit must then be configured to recognize that some data was not properly received and enter into an error recovery mode. Various known error recognition and error correction techniques exist. In most systems, error recovery is performed strictly in software. However, interrupting a device in the system to perform error recovery in software is slow. Additionally, many error recognition and recovery mechanisms will require additional end-to-end transfers within the system which is directly time dependent on the amount of distance separating the two endpoints. In some applications, the performance impact when requiring a software layer in the system for error recovery is unacceptable. Therefore, a need exists in known communication systems for improved efficiencies in the amount of overhead required to implement data transmissions and provide data error recovery.

DETAILED DESCRIPTION OF THE DRAWINGS

Figure 1:
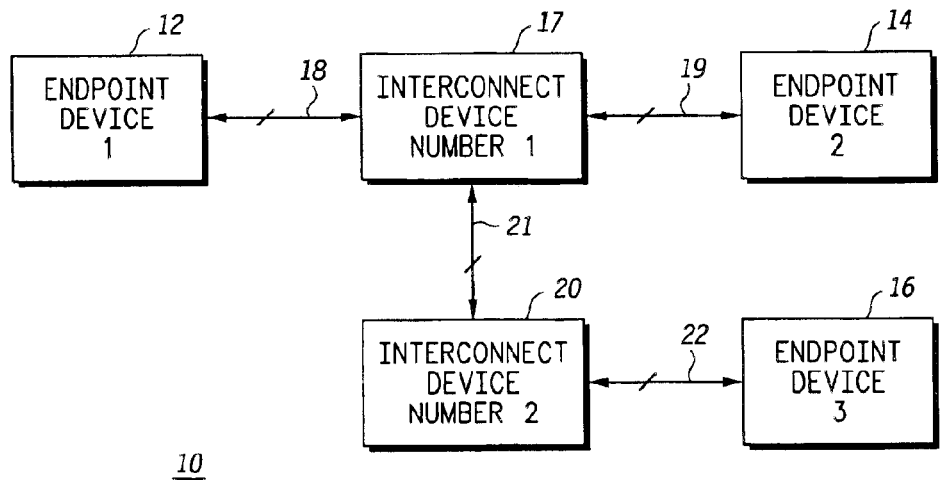
FIG. 1 illustrates in block diagram form a communication system architecture having a need for the present invention.

FIG. 1 illustrates a data processing system 10 which is a communication architecture in which the present invention may be implemented. Data processing system 10 is by way of example only and it should be well understood that the method taught in the present invention may be utilized in any communication system architecture in which an interconnect fabric couples two or more endpoint devices for the communication of information. It should also be well understood that unless specifically limited, the term 'data' is herein intended to include information which may function as either addressing information, control information or actual data. System 10 has three illustrated endpoint devices in the form of endpoint device 12, endpoint device 14 and endpoint device 16. System 10 also has two interconnect devices in the form of interconnect device 17 and interconnect device 20. Interconnect device 17 is connected to endpoint device 12 via a bi-directional communication bus 18 and is coupled to endpoint device 14 via a bi-directional communication bus 19. Interconnect device 20 is connected to interconnect device 17 via a bi-directional bus 21. Interconnect device 20 is connected to endpoint device 16 via a bi-directional bus 22.

In general, any of endpoint devices 12, 14 and 16 may communicate data in the form of packet transmissions to any of the other endpoint devices. Because of the bidirectional nature of the system, it is very likely that the interconnect fabric illustrated in the form of interconnect devices 17 and 20 will be concurrently receiving and transmitting packets associated with the same device. The distance between any two devices may be very small as the system 10 may be implemented on a single integrated circuit, or the distance between any two devices may be hundreds of miles. In either event, noise sources may create bit reversals and other transmission interrupts between two devices which results in erroneous data or no data being received at the receiving device. The present invention as discussed below provides a simple, fast mechanism for the transfer of information in packets between devices and the mechanism implements an efficient and fast method to both maintain packet ordering and implement error recovery.

Figure 2:
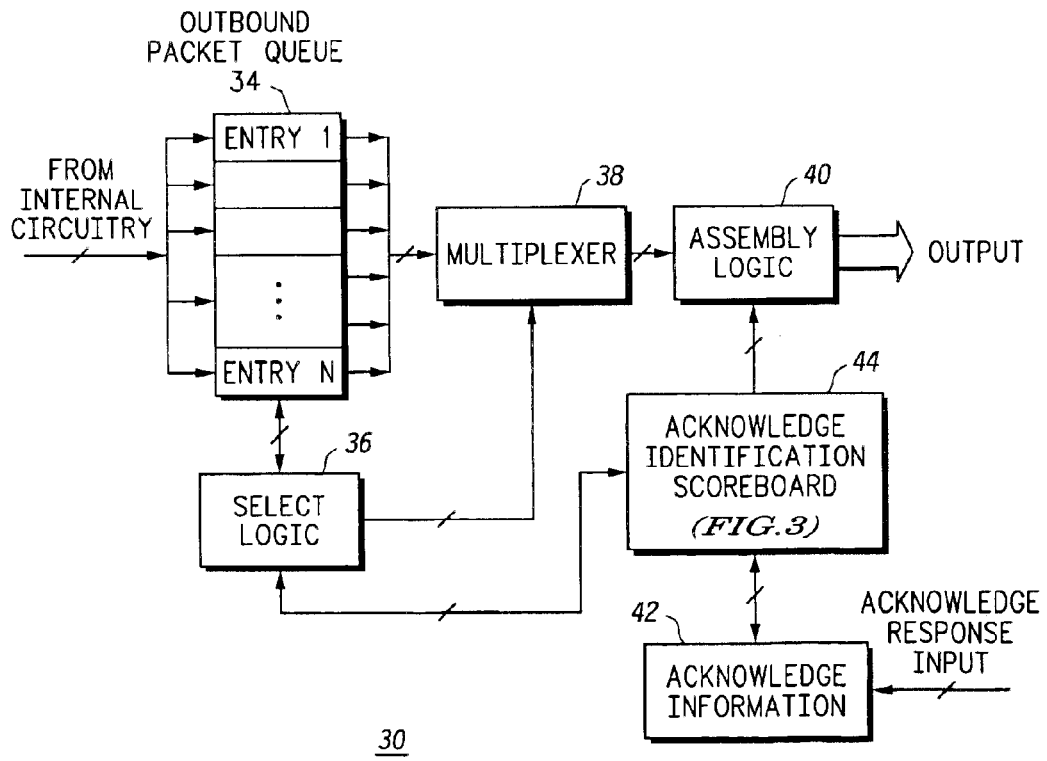
FIG. 2 illustrates in block diagram form an output section of a data communication device in accordance with the present invention.
Figure 5:
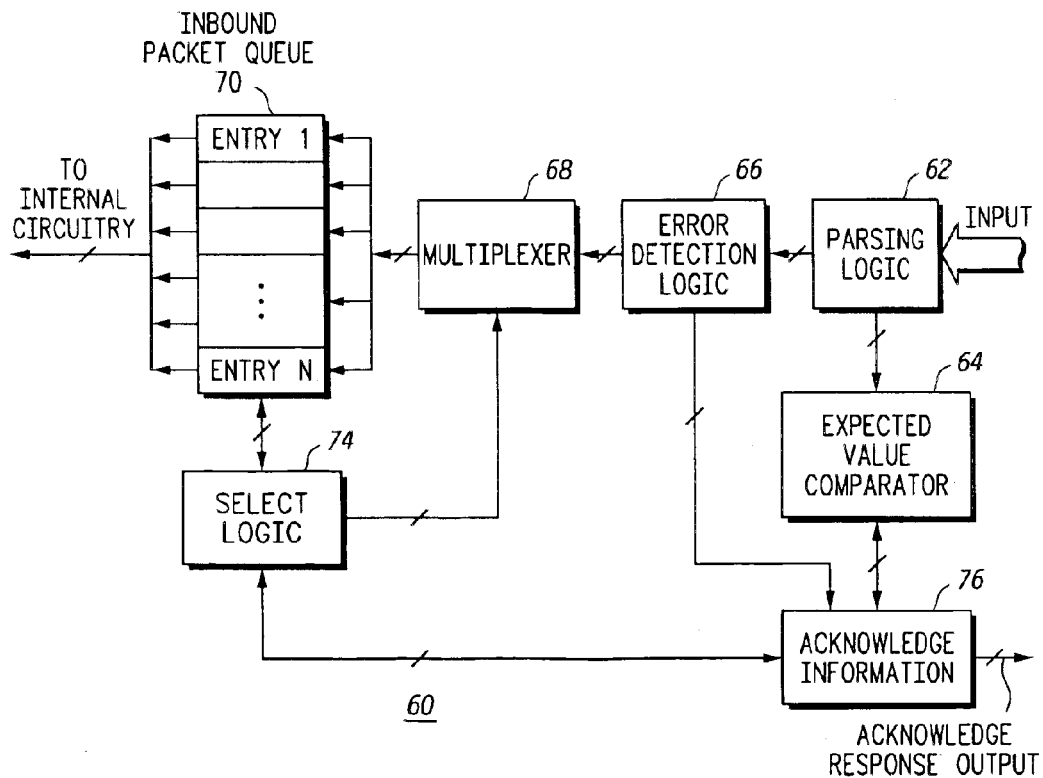
FIG. 5 illustrates in block diagram form an input section of a data communication device in accordance with the present invention.

In using the present invention in system 10, system 10 is not required to be a synchronous system. In a preferred form, system 10 is a source synchronous system. A source synchronous system is a system in which a clock is transmitted with a packet. The present invention may also be implemented in system 10 wherein each of the endpoint devices uses a clock having differing frequency. A source synchronous implementation simplifies the system design constraints allowing higher frequencies of operation and permitting devices to be separated by larger distances. In using the present invention with system 10, each of the endpoint devices 12, 14 and 16 and each of the interconnect devices 17 and 20 will have an output unit as illustrated in FIG. 2 and an input unit as illustrated in FIG. 5. It should be recognized that the present invention may be adapted for a number of communication system architectures and that use of the present invention in the architecture illustrated in FIG. 1 is exemplary only.

Illustrated in FIG. 2 is an output unit 30 having a plurality of input terminals for receiving input data from internal circuitry (not shown) of the device in which output unit 30 is implemented. Each input of the plurality of input terminals is respectively connected to a predetermined one of a plurality of entries 1 through N, where N is an integer, of an Outbound Packet Queue 34. Select Logic 36 has an input/output terminal connected to an input/output control terminal of Outbound Packet Queue 34. Outbound Packet Queue 34 has N output terminals, each of which is respectively connected to a predetermined one of the N entries in the Outbound Packet Queue 34. Each of the N output terminals is connected to an input of a Multiplexer 38. An output of Select Logic circuit 36 is connected to a control input of Multiplexer 38. An output of Multiplexer 38 is connected to an input of an Assembly Logic circuit 40. An output of Assembly Logic circuit 40 provides an Output for transmitting packet data as an output from one of the devices 12, 14, 16, 17 or 20. An Acknowledge (Ack) Response Input signal is received at an input of an Acknowledge Information circuit 42. Acknowledge Information circuit 42 has an input/output terminal connected to an input/output terminal of an Acknowledge Identification (ID) Scoreboard circuit 44 via a bidirectional bus. Acknowledge Identification (ID) Scoreboard circuit 44 has an output connected to a control input of Assembly Logic circuit 40.

In operation, partial packets are provided from circuitry (not shown) which is in the endpoint device in which output unit 30 is implemented. The partial packets are connected to the input of Outbound Packet Queue 34. These partial packets are used to form a complete packet having a format to be described more fully in connection with FIG. 4. The partial packets contain at least the data field and attributes of the complete packet. The partial packets are stored in the Outbound Packet Queue 34 in a successive order in which they are received. Select Logic circuit 36 functions to signal Outbound Packet Queue 34 both when and which entry within Outbound Packet Queue 34 may be released and also written over with a new partial packet. Select Logic circuit 36 also functions to control Multiplexer 38 to select the appropriate partial packet from the Outbound Packet Queue 34. Assembly Logic circuit 40 functions to receive a partial packet from Multiplexer 38 and assembles the complete packet by combining an ordering tag number value with the partial packet. Therefore, what is transmitted by Assembly Logic circuit 40 is a series of successively ordered packets. After Assembly Logic circuit 40 has provided a packet at the output, the next device which is coupled in the system 10 must receive the packet and confirm with an affirmative Acknowledge Response at the input of Acknowledge Information circuit 42 that the receiving device actually received the packet, that the packet which was received had the correct next expected ordering tag number value, and what the actual ordering tag number value was. Upon receipt of the Acknowledge Response, if the response is that the packet was accepted, the Acknowledge Information circuit 42 compares the returned ordering tag number value with the next expected ordering tag number value. If those values do not match, an error has occurred. If the received Acknowledge Response indicates that the packet was rejected by the destination device, the transmitting device also treats this condition as an error. It is also possible that the receiving device accepted the packet, but that a transmission error corrupted the affirmative Acknowledge Response. Therefore, Acknowledge Information circuit 42 also contains an error detection portion which can determine, using conventional error detection techniques, whether an error occurred in the transmission from the receiving device back to Acknowledge Information circuit 42. A discussion regarding the transmitting device when errors are detected is provided below. Upon an affirmative Acknowledge Response, if the returned ordering tag number value and the next expected ordering tag number value match, and there are no transmission errors, an affirmative signal is provided to the Acknowledge Identification Scoreboard 44 to advance the next expected ordering tag number value. The Acknowledge Identification Scoreboard 44 also signals Select Logic 36 that the packet was successfully transmitted and received and can therefore be removed from Outbound Packet Queue 34. Select Logic circuit 36 then deletes the partial packet from the Outbound Packet Queue which was used to form the transmitted and received packet and indicates that the entry is available for use.

In response to a rejected packet response from the receiving device or upon detection of an error, Acknowledge Information circuit 42 provides a signal to Acknowledge Identification Scoreboard 44 which relays to Select Logic 36 and Assembly Logic 40 to stop the transmission of packets. Assembly Logic 40 transmits a request to the receiving device to provide its current next expected ordering tag number value. When Acknowledge Information circuit 42 receives the next expected ordering tag number value from the receiving device the returned value is compared to both the next expected ordering tag number value and the outstanding ordering tag number value or values. If the returned value matches one of the next expected or outstanding values, the Acknowledge Identification Scoreboard 44 backs up to the returned value and begins issuing ordering tag number values starting with that returned value and indicates to the Select Logic circuit 36 which packets need to be re-transmitted, if any. If the returned value does not match one of the outstanding values, a fatal error has occurred and transmission cannot be restarted without software layer assistance. The rejected packet response can be optimized in the situation where there was no transmission error on the response. In that case, the returned ordering tag number value is used as the point to back up to in the Acknowledge Information Scoreboard 44 and the transmitting device does not have to query the receiving device.

Figure 3:
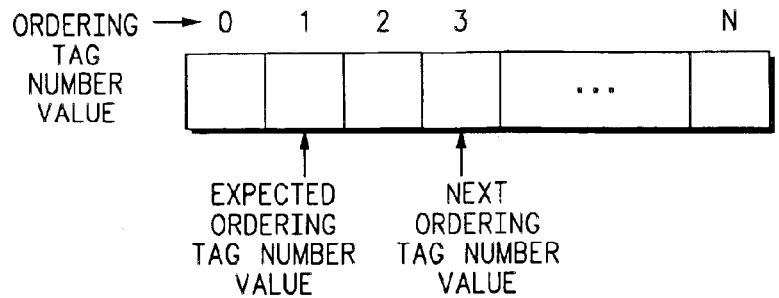
FIG. 3 illustrates in organizational layout form the Acknowledge Identification Scoreboard of FIG. 2.

Illustrated in FIG. 3 is a detail of one implementation of Acknowledge Identification Scoreboard 44. Acknowledge Identification Scoreboard 44 is illustrated having N distinct ordering tag number values for maintaining packet ordering. It should be well understood that the tag number ordering may be modified and the illustrated order is exemplary only. For example, the ordering tag number values do not have to be assigned in succession as long as an order is defined and followed. Acknowledge Identification Scoreboard 44 functions to keep track within output unit 30 of the next expected ordering tag value for which a return Acknowledge Response is expected to be received. Additionally, Acknowledge Identification Scoreboard 44 functions to identify the next assigned ordering tag number value that is to be used to transmit a packet. As illustrated in FIG. 3, Acknowledge Identification Scoreboard 44 may be implemented as a register device having two distinct pointer values which track these two ordering tag number values. It should be understood that the Acknowledge Identification Scoreboard 44 allows up to N packets to be successively transmitted before receiving the Acknowledge Response associated with the first packet that is transmitted. In this manner, the present invention permits an efficient tansmission of information that is not limited to a single outstanding transaction.

Figure 4:
FIG. 4 illustrates in organizational layout form the format of a packet of information transmitted in accordance with the present invention.

Illustrated in FIG. 4 is an organizational layout of the complete packet of information. In a preferred form, each packet has three general components. An ordering tag number of predetermined number of bits is used to identify the order of each packet. The value for the ordering tag number is provided to Assembly Logic 40 by the Acknowledge Identification Scoreboard 44. In a preferred form, the ordering tag number has three bits and therefore provides a total of eight possible values which the packets may be assigned. Additionally, each packet has a predetermined number of bits used in an attributes field. The remainder of bits in the packet contain data.

In the illustrated example of output unit 30, the destination device which receives the output of Assembly Logic 40 must also be keeping track of what the ordering tag number value should be for the next packet. If the ordering tag number value of the received packet does not match that of the next expected ordering tag number value, then the destination device considers an error to have occurred. In response, the Acknowledge Response which is returned as an input to the originating output unit is returned indicating that the packet was rejected as previously described.

Output unit 30 in this manner functions to guarantee properly ordered packet delivery from device to device and therefore end-to-end in a system such as system 30, as the immediately next coupled device will have an input unit which functions to implement the functionality associated with the Acknowledge Response signal discussed above. Illustrated in FIG. 5 is an input unit 60 which illustrates one of numerous implementations of the desired functionality. Input unit 60 receives an input packet from an originating device at an input terminal labeled "Input". The input terminal is connected to an input of a Parsing Logic circuit 62. A first output of Parsing Logic circuit 62 is connected to an input of an Expected Value Comparator 64. A second output of Parsing Logic 62 is connected to an input of an Error Detection Logic circuit 66. A first output of Error Detection Logic circuit 66 is connected to a first input of a Multiplexer 68. An output of Multiplexer 68 is connected to each of a plurality of entry inputs of an Inbound Packet Queue 70. Packet queue 70 has a plurality (1 through N, where N is an integer) of storage entries. Each of the storage entries has an output which is coupled to circuitry (not shown) internal to the device containing input unit 60. A Select Logic circuit 74 has a first input/output terminal output connected to an input/output terminal of the Inbound Packet Queue 70 via a bidirectional bus, an output connected to a control input of Multiplexer 68 and a second input/output terminal connected to a first input/output terminal of an Acknowledge Information circuit 76 via a bidirectional bus. Select Logic circuit 74 has inputs (not shown) which permit Select Logic circuit 74 to know if an error was detected and therefore whether to pass packets into and out of Inbound Packet Queue 70. An output of Error Detection Logic circuit 66 is connected to an input of the Acknowledge Information circuit 76. An input/output terminal of Expected Value Comparator 64 is connected to a second input/output terminal of the Acknowledge Information circuit 76 via a bidirectional bus. An output of the Acknowledge Information circuit 76 provides the Acknowledge (Ack) Response as an output.

In operation, it is required that an associated output and input unit initialize their next expected ordering tag number values to the same value and advance in the same order. That means that the Next Expected Ordering Tag Number Value and the Next Assigned Ordering Tag Number value must be reset to the same value in the output unit and those two values must advance in the same order. When an input packet is received, Parsing Logic 62 functions to remove the ordering tag number value and couple the ordering tag number value to Expected Value Comparator 64 for comparison with the next expected ordering tag number value. If the expected and received values match, the comparator 64 advances the Next Expected Ordering Tag value in the same manner an output unit will advance ordering tag number values as packets are output and acknowledged. If the received ordering tag number value is the same as the next expected ordering tag number value, then comparator 64 provides a signal to Acknowledge Information circuit 76 of that occurrence. However, before Acknowledge Information circuit 76 will provide an Acknowledge Response back to the device which just sent the input packet, two additional approvals have to be obtained. Parsing Logic circuit 62 provides the data portion of the packet to the Error Detection Logic 66. Error Detection Logic 66 may be implemented in accordance with a number of known error detection techniques. For example, Error Detection Logic 66 may perform a parity bit check or cyclic redundancy check. In response to the error detection function, Error Detection Logic circuit 66 provides a signal to the Acknowledge Information circuit 76 which indicates whether there were any errors in the received data or not. Additionally, Select Logic circuit 74 functions to determine whether or not there is an available storage entry within the Inbound Packet Queue 70 so that the packet, assuming the packet had the expected tag ordering number value and that the data contained no transmission errors, may actually be stored. Select Logic circuit 74 provides the Acknowledge Information circuit 76 with that information. If there is available storage in Inbound Packet Queue 70, and if there were no detected packet errors, and if the correct ordering tag number value for the received packet was confirmed, the packet is stored in Inbound Packet Queue 70. At that point, Acknowledge Information circuit 76 provides the Acknowledge Response to the output unit which provided the input packet indicating that the packet has been accepted. However, if any one of those three conditions do not exist, then an Acknowledge Response is provided to the output unit indicating that the packet has been rejected.

It should be noted that if an error is detected by Error Detection Logic circuit 66, the error correction mechanism is totally resident in hardware. No software handling routine is necessary. The hardware handling of the error by resending the packet is faster than trying to address the error correction using software. A communication system which utilizes the present invention is able to tolerate transient errors between devices and quickly retry the transmission to correct such transient errors. Also, since an output unit such as unit 30 is implemented in each of the devices of FIG. 1 and since an input unit such as unit 60 is implemented in each of the devices of FIG. 1, there are no end-to-end packet delivery responses in the system, such as between endpoint device 12 and endpoint device 16. Such end-to-end delivery response schemes tend to be more prone to delay and data corruption. The packet delivery is guaranteed for each device-to-device 'hop' through the system. Therefore, the ordering tag number value for each packet is reassigned for each hop thereby avoiding system end-to-end ordering tags. Using the method taught herein, the system is guaranteed to transmit properly ordered packets between endpoint devices. The present invention permits a simplified interconnect design. Because the ordering tag number value of a transmitting device and the ordering tag number value of a receiving device are initialized and advanced in the same fashion, devices remain packet order synchronized whether or not they are clock synchronized. The device synchronization which results from the strict ordering is why the entire system does not have to be clock synchronized at the same frequency. Also, should a same frequency clock be used for two or more of the system devices, those devices do not have to be phase synchronized. If the present invention is implemented in a source synchronous system, the clock which is transmitted in each packet may be encoded in the data, such as the conventional 8B10B encoding. A system which uses the present invention is simplified and yet guaranteed to maintain proper ordering of packets which are being communicated between devices.

By now it should be apparent that there has been provided a method and apparatus for maintaining packet ordering in a communication system which implements error recovery and which has multiple outstanding packets required to be transferred between devices in the system. Various physical implementations of the present invention may be readily utilized. For example, any type of endpoint device, such as a processor, a memory controller, or a peripheral controller, may be used. Numerous physical implementations may be created to implement the packet ordering and the various logic circuits. For example, instead of using a second pointer within the Acknowledge Identification Scoreboard 44 to indicate a next assigned ordering tag number value, the second pointer could instead indicate the most recently sent ordering tag number value and the system configured accordingly. Although multiple conductor buses are preferred, single conductors may be used for all the unnumbered internal buses. Therefore, it is intended that this invention encompass all such variations and modifications as fall within the scope of the appended claims.

What is claimed is:

1. In a system comprising two communicating devices, a method of communication comprising:

creating information packets, each of which has an assigned known order number from a plurality of order values;

organizing the order values in a predetermined order which the information packets must be transmitted and received in;

transmitting the information packets in successive packets solely in accordance with the predetermined order from a first of the two communicating devices to a second of the two communicating devices;

successively checking and verifying that each of the information packets which is received is being received pursuant to the predetermined order; and either (1) accepting in the predetermined order each received information packet by providing an acknowledge response from the second of the two communicating devices to the first of the two communicating devices; or (2) rejecting a specific information packet by providing the acknowledge response, the rejecting forcing the first of the two communicating devices to determine which specific information packet was rejected and to resend the specific information packet which was rejected until the specific information packet is accepted by the second of the two communicating devices;

detecting at the second of the two communicating devices that the specific information packet does not have a correct order value or that there are errors associated with the specific information packet which was received;

sending the acknowledge response to the first of the two communicating devices indicating said detecting;

responding to the acknowledge response by having the first of the two communicating devices request the second of the two communicating devices to transmit a present order value of the second of the two communicating devices; and forcing the first of the two communication devices to transfer one or more information packets beginning with tho present order value provided by the second of the two communicating devices.

2. The method of communication of claim 1 further comprising:
upon the first of the two communicating devices receiving the acknowledge response indicating acceptance by the second of the two communicating devices of a predetermined information packet, tracking the plurality of order values to indicate which of the plurality of order values is a next expected order value.

3. The method of communication of claim 1 further comprising:
before receiving the acknowledge response, transmitting additional information packets following the predetermined order and creating an indicator within the first of the two communicating devices to indicate an order value of a next information packet to be transferred.

4. The method of communication of claim 1 further comprising:
including with the acknowledge response from the second of the two communicating devices a present value of the order number which the second of the two communicating devices used to decide to accept or reject a presently pending information packet being processed.

5. The method of communication of claim 1 further comprising:
checking for communication errors at the second of the two communicating devices by implementing a predetermined error checking scheme of the information packets which the second of the two communicating devices receives.

6. The method of communication of claim 1 further comprising:
implementing the system as a source synchronous system by transmitting a clock with the information packets.

7. The method of communication of claim 1 further comprising:
clocking the first of the two communicating devices with a first clock signal and clocking the second of the two communicating devices with a second clock signal, the first clock signal and the second clock signal being asynchronous with respect to each other.

8. The method of communication of claim 1 further comprising:
coupling a third communicating device to the second of the two communicating devices, the first of the two communicating devices communicating the information packets to the third communicating device by following the steps of claim 1; and
repeating the steps of claim 1 between the second of the two communicating devices and the third communicating device, thereby eliminating delivery responses between the first of the two communicating devices and the third communicating device.

9. In a system comprising two communicating devices, a method of communication comprising:
creating information packets, each of which has an assigned known order number from a plurality of order values;
organizing the order values in a predetermined order which the information packets must be transmitted and received in;
transmitting the information packets in successive packets solely in accordance with the predetermined order from a first of the two communicating devices to a second of the two communicating devices;
successively checking and verifying that each of the information packets which is received is being received pursuant to the predetermined order; and either
(1) accepting in the predetermined order each received information packet by providing an acknowledge response form the second of the two communicating devices to the first of the two communicating devices; or
(2) rejecting a specific information packet by providing the acknowledge response, the rejecting forcing the first of the two communicating devices to determine which specific information packet was rejected and to resend the specific information packet which was rejected until the specific information packet is accepted by the second of the two communicating devices;
detecting at the second of the two communicating devices that no errors exist associated with the specific information packet which was received;
determining that the specific information packet could not be accepted due to an inability of the second of the two communicating devices to store the specific information packet;
providing the acknowledge response to the first of the two communicating devices indicating the specific information packet which could not be accepted by the second of the two communication devices; and
forcing the first of the two communicating devices to retransfer to the second of the two communicating devices the specific information packet which could not be accepted by the second of the two communication devices.

10. A device for use in a system, the device adapted to transmit and receive information packets with an additional device, the device comprising:
assembly circuitry for creating and transmitting information packets, each of which has an assigned known order number from a plurality of order values, and organizing the order values in a predetermined order which the information packets must be transmitted and received in;
acknowledgement circuitry for receiving responses from the additional device indicating whether the additional device successfully received an information packet of correct order value;
tracking circuitry coupled to the acknowledgement circuitry and the assembly circuitry for maintaining an indication of a current order value of an information packet which is to be next approved by the additional device and an indication of a next order value of an information packet which is to be next transmitted, the tracking circuitry controlling the assembly and transmission of information packets by the assembly circuitry;
parsing circuitry for receiving information packets from the additional device, the parsing circuitry separating a data field from an order number field of each of the information packets;
comparison circuitry coupled to the parsing circuitry for comparing a received order number with an authorized order number for a next authorized information packet to be received;
error detection circuitry coupled to the parsing circuitry for receiving the data field of each of the information packets and determining whether any data errors exist, the error detection circuitry providing an error signal in response to detection of an error;

storage and logic circuitry for determining if resources exist to store the next authorized information packet to be received and for storing the next authorized information packet;

acknowledge circuitry coupled to the comparison circuitry, to the error detection circuitry and to the storage and logic circuitry, the acknowledge circuit providing an acknowledge response to the additional device indicating whether the next authorized information packet was received, had no errors and could be stored.

11. The device of claim 10 further comprising:

an outbound information packet queue coupled to the assembly circuitry for storing data portions of information packets prior to transmission;

and wherein the storage and logic circuitry further comprises an inbound information packet queue for storing data portions of received information packets upon approval of a received information packet by the acknowledge circuitry.

12. The device of claim 11 wherein the information packets each comprise a first field which comprises the plurality of order values, a second field which comprises an attributes field, and a third field which comprises a data field.

13. The device of claim 11 wherein the tracking circuitry further comprises a scoreboard register, the scoreboard register having a storage location for each of the plurality of order values, a first pointer value which indicates an expected order value to be next acknowledged by the acknowledge response, and a second pointer value which indicates a next order value to be used in connection with a transmitted information packet.

14. A method of communicating information packets between a transmitting device and a receiving device, comprising:

ordering the information packets in a predetermined order to be transmitted and received;

transmitting the information packets solely in the predetermined order from the transmitting device to the receiving device;

receiving the information packets solely in the predetermined order with the receiving device and successively checking each received information packet to determine if each information packet can be accepted;

providing a response from the receiving device to the transmitting device, the response indicating if transmitted information packets are accepted;

if a response indicates a rejected information packet due to the receiving device detecting an error associated with the rejected information packet, sending a request from the transmitting device to the receiving device for an order number of the rejected information packet and resending information packet transmission beginning with the order number of the rejected information packet;

if a response indicates a rejected information packet due to the receiving device being unable to accept the rejected information packet although no specific error associated with the rejected information packet was found, sending a response to the transmitting device indicating rejection was due to being unable to accept the rejection information packet and forcing the transmitting device to back up to the rejected information packet and retransmit the rejected information packet.

15. The method of claim 14 further comprising:

using a scoreboard register in the transmitting device to indicate what ordering value is associated with a next response from the receiving device associated with a transmitted information packet and to indicate what ordering value is associated with a next information packet transmission.

16. The method of claim 14 further comprising:

providing an interconnect device between the transmitting device and the receiving device, the interconnect device functioning to receive information packets as the receiving device does and functioning to transmit information packets as the transmitting device does, wherein information packets are bidirectionally communicated by the interconnect device.

17. The method of claim 14 further comprising:

clocking the transmitting device with a first clock;

clocking the receiving device with a second clock which is asynchronous with first clock.

18. The method of claim 14 further comprising:

before receiving a response from the receiving device regarding a first transmitted information packet, transmitting one or more additional information packets in predetermined order to the receiving device.

* * * * *

UNITED STATES PATENT AND TRADEMARK OFFICE
CERTIFICATE OF CORRECTION

PATENT NO. : 6,862,283 B2
DATED : March 1, 2005
INVENTOR(S) : Bryan D. Marietta et al.

It is certified that error appears in the above-identified patent and that said Letters Patent is hereby corrected as shown below:

<u>Title page,</u>
Item [73], Assignees, change "Mercury Computer Sytemc, Inc." to -- Mercury Computer Systems, Inc --

<u>Column 9,</u>
Line 2, change "transfer" to -- retransfer --
Line 3, change "tho" to -- the --

<u>Column 10,</u>
Line 8, change "form" to -- from --

Signed and Sealed this

Seventh Day of June, 2005

JON W. DUDAS
*Director of the United States Patent and Trademark Office*